Dec. 8, 1970  V. P. FRIBERG ET AL  3,545,273
ELECTRONIC THERMOMETER

Filed June 13, 1968  2 Sheets-Sheet 1

INVENTORS
VINCENT P. FRIBERG
DONALD F. WISEMAN
JOHN CHESNEY
BY
James and Franklin
ATTORNEY

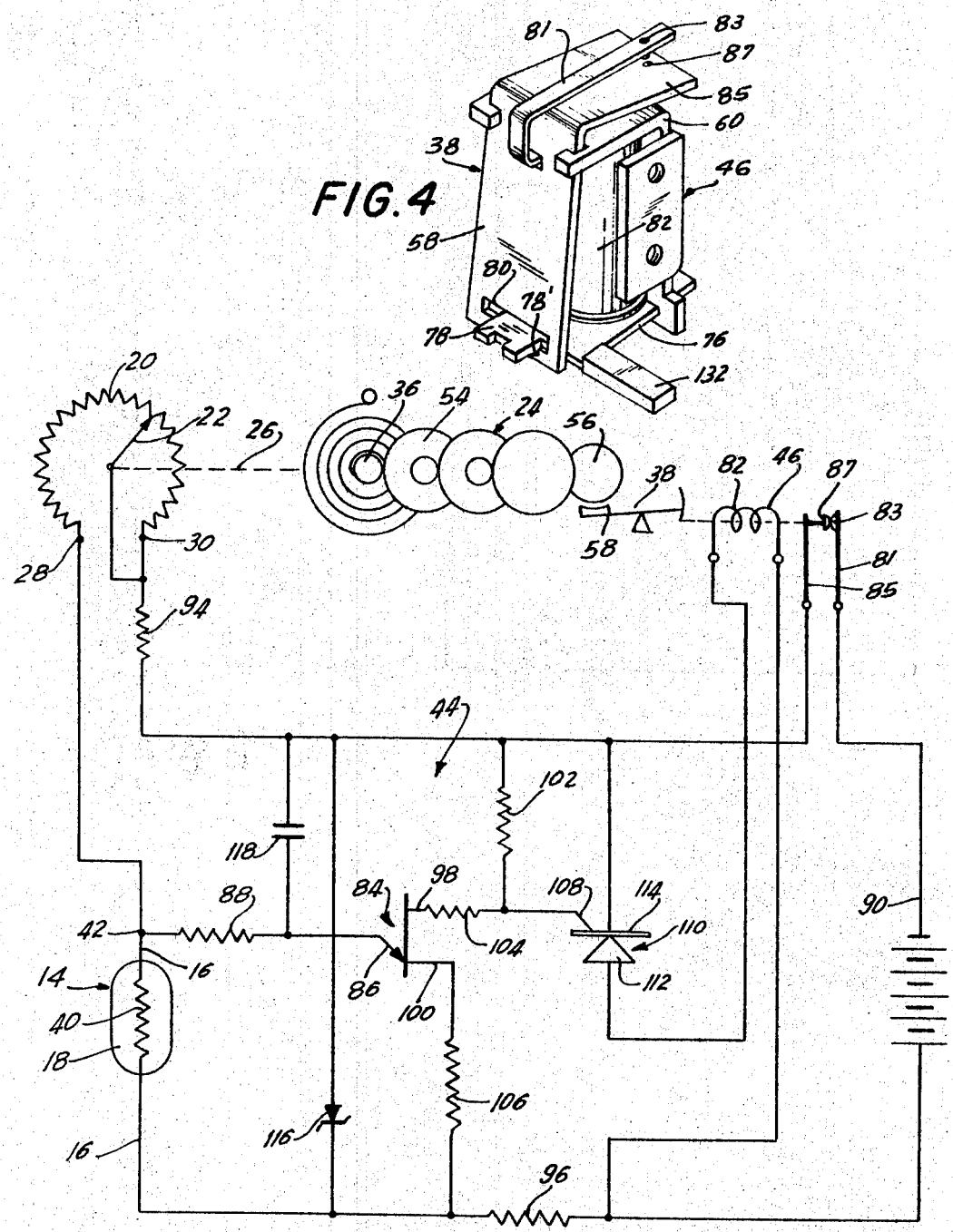

United States Patent Office 3,545,273
Patented Dec. 8, 1970

3,545,273
ELECTRONIC THERMOMETER
Vincent P. Friberg, Leonia, Donald F. Wiseman, Wayne, and John Chesney, Roselle Park, N.J., assignors to General Instrument Corporation, Newark, N.J., a corporation of New Jersey
Filed June 13, 1968, Ser. No. 736,682
Int. Cl. G01k 7/24
U.S. Cl. 73—362
8 Claims

ABSTRACT OF THE DISCLOSURE

A temperature measuring and indicating device comprises a sensor adapted to be exposed to the measured temperature and having a resistance which varies with the measured temperature. A variable resistance is driven from a first toward a second resistance value and is stopped when the resistances of the sensor and the variable resistance reach a predetermined relationship. An indicator is operatively connected to the driving means to provide an indication or readout of the measured temperature as a function of the resistance value of the variable resistance when it is stopped.

---

The present invention relates to a condition measuring and indicating device, and more particularly to a condition measuring device of the type having a sensor adapted to be exposed to the measured condition and which provides an indication or readout of the measured condition which remains fixed even though the condition might change.

While it will be understood that the measuring and indicating device of this invention may be utilized to advantage in the measurement of many different conditions which can be converted into a electrical property, such as pH factor, resistance, current, pressure and the like, the invention will be specifically disclosed herein as relating to a temperature measuring and indicating device, e.g. a medical thermometer for use in providing a visual indication of body temperature.

Devices are known which measure and provide an indication of the value of a condition in which a sensor is employed having an electrical property the value of which is proportional to the value of the measured condition. The variation in the electrical property of the sensor is then detected and converted into a numerical or graphical indication of the measured condition. Known devices of this type generally incorporate the resistance value of the sensor in a bridge circuit, the unbalancing of which, resulting from variations in the electrical properties of the sensor due to variations in the measured condition, is effective to drive a servo system or the like and thus to operate a graphical recorder or meter.

These known devices generally require a relatively high degree of skill both in their manner of operation and in the interpretation of the measured data. The known equipment is often bulky, complex and relatively expensive and unreliable.

Another disadvantage of the known measuring and indicating devices is that the indication of the measured condition is often not maintained indefinitely. That is, when the sensor is removed from the environment at which the condition is measured, the reading or indication changes. The indication of the measured condition is present only while the sensor is exposed to that condition, and effectively disappears when the sensor is removed from that condition. With particular reference to a clinical thermometer such as the conventional glass mercury bead thermometer, there is the additional drawback that this thermometer is difficult to read and requires violent action to reset it to measuring condition. Also, it is fragile, and the breaking of a glass thermometer results in the spilling of liquid mercury and the strewing of broken glass, both extremely hazardous.

It is thus a general object of the present invention to provide a condition measuring and indicating device which measures and provides an accurate reading of a condition in a manner which overcomes the above described disadvantages of condition measuring and indicating devices known to the prior art.

It is a further object of the present invention to provide a condition measuring and indicating device which may be readily operated by individuals having a minimum of skill and training.

It is another object of the present invention to provide a measuring and indicating device providing an indication of the measured condition which will remain fixed until the device is reset for a subsequent measurement, even though the condition may subsequently change or the device may be removed from the measured environment.

It is yet a further object of this invention to provide a measuring and indicating device which is relatively compact, rugged in construction, accurate in operation, and which may be readily and reliably operated for a great number of measuring operations.

It is still a further object of the present invention to provide a measuring and indicating device in which the visual indication is very readily observed and interpreted, and which provides a substantially instantaneous reading of the measured condition.

It is a more specific object of the present invention to provide an electronic clinical thermometer which provides an indication of a patient's temperature, which may be readily viewed, and which remains so viewable for an indefinite period of time.

It is a further object of this invention to provide a rugged electronic clinical thermometer which may be readily used to accurately measure the temperature at various parts of the body.

To these ends, the condition measuring and indicating device of the present invention comprises a sensing means (sensor) adapted to be exposed to the condition being measured and which has an electrical property varying with said condition. The sensor is operatively connected to a variable electrical means which is varied from a first value of a given electrical property toward a second value thereof by suitable driving means. The movement of the driving means, and thus the variable means, is stopped by a control means which becomes operative when the electrical properties of the sensor (determined by the measured condition) and the variable means reach a predetermined relationship. An indicator or other readout device is operatively connected to the variable means and thus provides an indication of the stopped position of the drive mechanism and thus of the variable means, thereby providing an indication of the measured condition.

In a preferred embodiment of this invention as herein specifically disclosed, the measured condition is temperature, and the sensor is a thermistor, the resistance of which varies with changes in the measured temperature. The variable means is in the form of a potentiometer in circuit arrangement with the thermistor.

The potentiometer is set to a first resistance value by a manual reset means, and is driven towards its second value by the drive mechanism, which preferably is in the form of a spring-operated clock mechanism, the resetting of the potentiometer to its first resistance value also serving to wind the spring. Means are provided to normally maintain the drive mechanism in a stopped condition, and to disable the maintaining means in order to operate the drive mechanism and the variable means, and thus to commence a measuring operation.

As the drive mechanism proceeds to operate, the potentiometer is driven toward its second resistance value, which as here disclosed is greater than its first resistance value. When the resistance of the potentiometer and the thermistor (reflecting the measured temperature) reach a predetermined ratio, a control circuit is made operative, which in turn is effective to stop the drive mechanism along with the potentiometer. A readout device, in the form of a calibrated dial connected to the potentiometer shaft, will provide an accurate visual indication of the temperature sensed by the thermistor.

The control circuit is effective, upon being operated as described above, to energize an actuating means which comprises an electromagnet. A first member is movable between a first position in which it engages and thus stops the drive mechanism, and a second position in which it is disengaged from the drive mechanism. A second member is effective to latch the first member in its second position, but is actuable upon the energization of the actuating means to release the first member to its first, or engaging position.

The control circuit associated with the sensor and potentiometer, which is effective to control the operation of the actuating means, preferably comprises a uni-junction transistor which fires when the voltage developed at the junction of the thermistor and potentiometer reaches a predetermined level, and thus triggers a silicon-controlled rectifier into conduction, thereby energizing the electromagnet.

Other features of the present invention include means for disconnecting an electrical source from the control circuit upon the energization of the electromagnet, thereby to prevent excessive current drain and reset the rectifier into a non-conductive state, and a brake effective to temporarily maintain the drive mechanism in the stopped condition even when the first member is disengaged therefrom until the manual control is released, thereby to avoid a possibly erroneous reading if the manual actuation fails to latch the actuating means in a position disengaged from the drive mechanism.

To the accomplishment of the above, and to such other objects as may hereinafter appear, the present invention relates to the construction and manner of operation of a condition measuring and indicating device as defined in the appended claims and as described in this specification, taken together with the appended drawings, in which:

FIG. 3 is a mechanical and electrical diagram schematically illustrating the sensing, actuating, control, and drive portions of the device of FIG. 1; and FIG. 4 is an enlarged detailed view of the latching mechanism of the device of FIG. 1.

Figure 1:
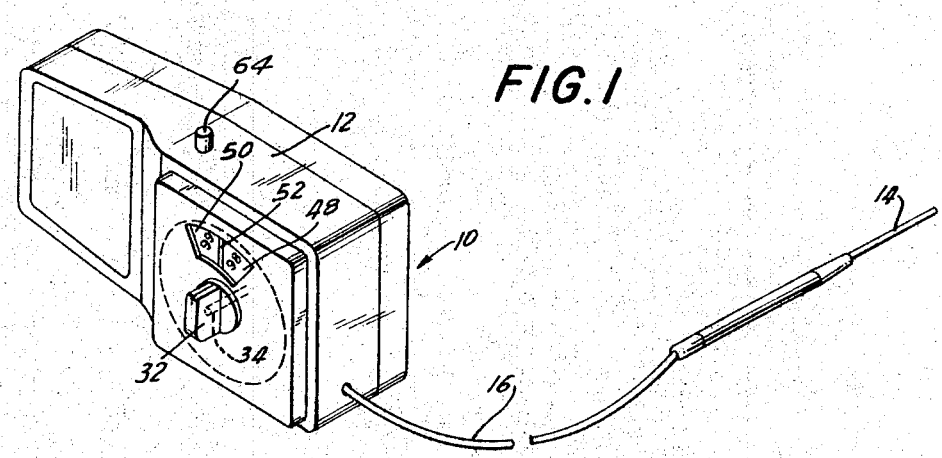
FIG. 1 is a perspective view of the condition measuring and indicating device of the present invention.

In the exemplary embodiment of the present invention illustrated in the figures, the condition measuring and indicating device 10 is a temperature measuring device, i.e. a thermometer, but it is to be understood that the device may, with minor modifications, be used with equal facility and advantage in the measurement of numerous other conditions such as, but not limited to, current, voltage, resistance, pH, etc., which are effective to vary the electrical properties of the sensor utilized with the device.

The mechanical and electrical elements of device 10 are housed in a two-piece, sturdy, relatively unbreakable plastic casing 12 from which a sensor in the form of a themistor probe 14 extends. An elongated, flexible electrical conductor 16 connects the thermistor element 18 within probe 14 to the components housed within the interior of casing 12.

Thermistor 18 is in circuit arrangement with a variable resistance means in the form of a potentiometer 20, having a wiper arm 22 driven by a drive mechanism designated generally as 24, the operative connection between drive mechanism 24 and wiper arm 22 being effected by a shaft 26 shown schematically in FIG. 3. Wiper arm 22 is rotatable in a counterclockwise direction by drive mechanism 24, between a first minimum resistance value position at which wiper arm 22 contacts point 28, and towards a second, maximum resistance value position at which wiper arm 22 comes into contact with point 30.

Prior to a temperature measurement, the instrument is reset to starting condition—wiper arm 22 is placed at its first position by manually rotating a knob 32 secured to an extension 34 of shaft 26, this rotation of knob 32 also being effective to wind a main spring 36 of drive mechanism 24 secured to the other end of shaft 26.

Drive mechanism 24 is normally (i.e. between measurements) maintained in a stopped condition by a braking device generally designated as 38. To operate the device 10 to begin a measuring operation, braking device 38 is released to permit the wound spring 36 to unwind, thus causing operation of drive mechanism 24, and thus the rotation of shaft 26 along with wiper arm 22 of potentiometer 20. Thermistor 18 has at this time been placed at the location at which the temperature is being measured, so that the resistance of thermistor 18, indicated as 40, is proportional to the measured temperature. As the resistance of potentiometer 20 increases with the clockwise rotation of wiper arm 22 towards point 30, the voltage at point 42, located at the junction of thermistor resistor 40 and potentiometer 20, increases. This voltage represents the instantaneous ratio of the temperature-controlled resistance of resistor 40 and the resistance value of potentiometer 20 which continuously varies as wiper arm 22 rotates with shaft 26.

When this voltage ratio reaches a predetermined level, the voltage at point 42 reaches a level sufficient to operate a control circuit generally designated 44, which when so operated is effective to energize a brake activating device here shown as comprising a relay 46, which actuates brake 38, causing drive mechanism 24 and thus the wiper arm 22 of potentiometer 20, to stop. This relative position of wiper arm 22, now fixed in its position, is thus proportional to the resistance 40 of thermistor 18, and hence to the measured temperature.

Shaft extension 34 also carries a dial 48 carrying suitable calibrated indicia such as numerical temperature values in the anticipated range of measured temperatures, a portion of which is visible through a window 50 provided in casing 12. An indicating marker 52 is etched or otherwise formed in window 50, so that the indicia on dial 48 in registry with marker 52 provides a visual numerical indication of the measured temperature. This indication will be retained until a new measuring operation is started by resetting the device to starting condition. Thus, the visual indication of the measured temperature is retained for an indefinite period of time.

Figure 2:
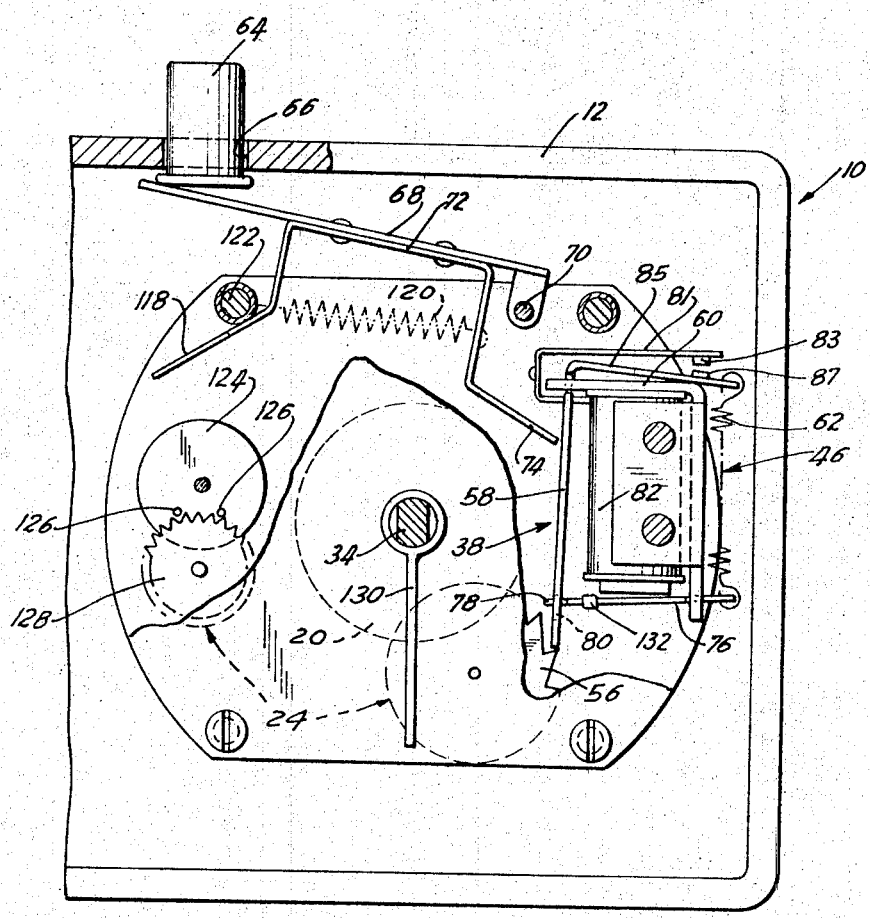
FIG. 2 is a partial vertical section taken through the device shown in FIG. 1.

In the embodiment herein shown, drive mechanism 24 is in the form of a conventional spring-operated clock mechanism comprising an escapement mechanism 54 which drives shaft 26 at a constant rate when brake 38 is released and spring 36 is allowed to unwind. Drive mechanism 24 is provided with a ratchet wheel 56, which when engaged by a pawl member 58 as shown in FIG. 2, effectively brakes the drive mechanism 24, thereby to constitute the brake 38. Pawl member 58 is carried on a support bracket 60, and is normally biased toward its braking engagement with ratchet wheel 56 by means of a spring 62.

To release pawl member 58 from its braking engagement with ratchet wheel 56, and thus to begin a measuring operation, a manual control member comprising push button 64, extending through an opening 66 in casing 12, is depressed causing a lever arm 68 to pivot about its fulcrum 70. Lever arm 68 carries a member 72 having a finger 74 one end of which is moved against and urges pawl member 58 out of engagement with ratchet wheel 56 when lever arm 68 is so pivoted. Spring 120, active between fixed pin 122 and finger 74, biases lever arm 68 in a clockwise direction as viewed in FIG. 2, thus causing push button 64 to project out from casing 12. Support bracket 60 also carries a latching member 76 carrying a tongue 78 extending therefrom (FIG. 4). Spring 62 acts to bias latching member 76 to pivot in a counterclockwise direction as viewed in FIG. 2. A transverse opening 80 is formed in pawl member 58 through which tongue 78 passes. The lower surface of tongue 78 has a slot 78' into which the lower edge of the slot 80 in pawl member 58 is received so as to latch pawl member 58 in a position away from ratchet wheel 56 when pawl member 58 is moved towards the right in FIG. 2 by means of finger 74, thus releasing the braking action of pawl member 58 on drive mechanism 24, Latching member 76 is responsive to the energization of an electromagnet 82 also carried by support 60, magnet 82 and latching member 76 constituting the braking relay 46. Magnet 82 is energized when control circuit 44 is rendered operative, and causes latching member 76 to be moved upwards towards magnet 82, thus releasing pawl member 58 from slot 78' in tongue 78, spring 62 then being once again effective to urge pawl member 58 into braking engagement with ratchet wheel 56. Thus, when electromagnet 82 is energized by the operation of control circuit 44, the drive mechanism 24, and hence wiper arm 22, shaft 26 and dial 48, are all substantially instantaneously stopped to provide the temperature reading at window 50.

A conductive leaf spring 81 is secured at one end to support 60 and carries at its other end a contact 83. A transverse arm 85 of pawl member 58 carries a second contact 87 which engages contact 83 when electromagnet 82 is deenergized and pawl member 58 is disengaged from ratchet wheel 56 and latched by latching member 76.

While many different embodiments of control circuit 44 could be used, the one here specifically disclosed is particularly advantageous from the point of view of accuracy and ambient temperature insensitivity. It comprises a unijunction transistor (UJT) 84 having its emitter terminal 86 connected to point 42 through a current limiting resistor 88. Point 42 constitutes the voltage take off point of the voltage divider comprising potentiometer 20 and the thermistor resistance 40. Voltage is applied across the voltage divider from a voltage source 90 one terminal of which is connected through closed contacts 83 and 87 and resistor 94 to point 30 and wiper arm 22 of potentiometer 20. The other terminal of voltage source 90 is connected through a voltage dropping resistor 96 to resistance 40 of thermistor 18.

The bases 98 and 100 of UJT 84, are respectively biased by resistors 102 and 104 and resistor 106. Base 98 is connected through resistor 104 to the gate terminal 108 of a silicon controlled rectifier (SCR) 110, the anode 112 of which is connected to one end of the electromagnet 82 of relay 46, the other end of electromagnet 82 being connected to the positive terminal of voltage source 90. The cathode 114 of SCR 110 is connected to the negative terminal of voltage source 90 through closed contacts 83 and 87. A Zener diode 116 is connected in parallel with the voltage divider circuit to maintain a constant voltage thereacross even when the voltage output of voltage source 90 varies from its nominal value. Capacitor 118 is connected between the negative terminal of voltage source 90 and the emitter 86 of unijunction transistor 84. A unijunction transistor 84 is employed as the voltage-sensitive triggering device because it is very sensitive to voltage, and shifts rapidly from non-conduction to conduction at a given voltage signal applied to its emitter. Moreover, this characteristic is very insensitive to temperature changes. Its power-handling capacity, however, is limited, and hence the silicon controlled rectifier 110 is employed, the latter being capable of switch operation while handling sufficient power to effectively energize electromagnet 82.

Thus, when brake 38 is released in the manner described above to begin a temperature measurement, spring 36 unwinds and shaft 26 rotates wiper arm 22 to increase the resistance of potentiometer 20, that is the resistance between point 28 and the moving contact of wiper arm 22. As a result the voltage at point 42 with respect to the potential at point 28 also increases, this voltage causing capacitor 118 to charge through resistor 88. When capacitor 118 has charged to a sufficient voltage level, UJT 84 will be fired, thus applying a signal at gate electrode 108 to trigger SCR 110 and thus energize electromagnet 82 to stop drive shaft 26 and wiper arm 22 at this point as described above. The pivoting of pawl member 58 when it is released from tongue 78 by the energization of electromagnet 82 also opens contacts 83 and 87 by pivoting arm 85 away from member 81 thus disconnecting voltage source 90 from the control circuit 44. This has two desirable effects. It prevents drain on voltage source 90 except when an actual temperature measurement takes place, and it resets rectifier 110 to a non-conductive state.

It has been found that on occasion when pushbutton 64 is depressed to disengage pawl member 58 from ratchet wheel 56, pawl member 58 will not be properly latched by tongue 78 of latching member 76. As a result, pawl member 58 will be inadvertently returned by the biasing force of spring 62 back into braking engagement with ratchet wheel 56 when pushbutton 64 is released. However, during the interval that pawl member 58 is held by pushbutton 64, drive mechanism 24 and dial 48 will move, thus providing a false temperature indication at window 50. The operator may not be aware that this improper operation has occurred, and he may therefore accept the incorrect dial reading as that of the measured temperature.

To prevent this from happening, member 72 is provided with a plate 118 which extends downwardly therefrom. A pivotably mounted escapement wheel 124 is provided with a pair of off-center pins 126 projecting from wheel 124 and engaging the teeth of ratchet wheel 128 so as to cause wheel 126 to oscillate when ratchet wheel 128, connected through conventional gearing to the drive mechanism 24, rotates along therewith. Thus when arm 68 is pivoted upon the depression of pushbutton 64, plate 118 engages the periphery of wheel 124, preventing it from oscillating and hence causing one of pins 126 to lock with the teeth of ratchet wheel 128. When this occurs, drive mechanism 24 is prevented from moving, and it will remain thus immobilized until pushbutton 64 is released, disengaging plate 118 from wheel 124 and thus freeing the locking pin 126 from its locking engagement with ratchet wheel 128 to once again permit the movement of drive mechanism 24.

It has also been found desirable to provide a safety mechanism to stop drive mechanism 24 after wiper arm 22 has moved to its maximum resistance position, in the event that the operation of relay 46 fails in its designed function. To this end, radially extending wire 130 is secured about shaft 26 and rotates along therewith. A lug 132 extends transversely from latching member 76 into the path of rotation of wire 130. The location of wire 130 with respect to lug 132 is such that when wiper arm 22 reaches its maximum resistance position, wire 130 will engage lug 132 to move tongue 78 out of latching engagement with pawl member 28, which is thereby urged by spring 62 into braking engagement with ratchet wheel 56. Thus, even if the energization of relay 46 is not effective to brake drive mechanism 24, the drive mechanism 24 will be positively stopped when wire 130 contacts lug 132, thereby to prevent excessive potentially damaging movement of wiper arm 22 in potentiometer 20.

Thus, the present invention has provided a condition measuring and indicating device which converts a change in an electrical property—i.e. the resistance change of a thermistor due to the measured temperature, into an accurately controlled movement of a calibrated dial. Since the firing voltage of the UJT 84 in the control circuit is precisely known and is accurately repeatable, that is, it will always fire at the same voltage level, the reading obtained on the rotated calibrated dial is always dependably accurate. Moreover, this reading will be retained for an indefinite period, that is, until the next measuring operation is initiated by turning knob 32 to rewind spring 36 and to return wiper arm 22 to its initial, minimum resistance position. To utilize the device of this invention for the measurement of other conditions, all that is required is the modification of the sensor, and a corresponding modification of the calibrated indicia on the dial.

While only a single embodiment of the present invention has been herein specifically disclosed, it will be apparent that many variations may be made thereto without departure from the scope of the invention.

We claim:
1. A condition measuring device providing a readout of the value of the condition being measured, said device comprising sensing means adapted to be exposed to said condition and effective to have an electrical property the value of which varies with said condition, variable means effective to have an electrical property variable between first and second values, driving means operatively connected to said variable means and effective to move said variable means from said first value towards said second value, control means operatively connected to said sensing means and said variable means effective to compare said electrical properties of said sensing means and said variable means, and effective to stop said variable means in response to the sensing of a predetermined relationship between said properties, and readout means operatively connected to said variable means and effective to provide a readout of said measured condition in terms of the condition of said variable means when it is stopped, means for restraining said driving means, manual means operatively connected to said restraining means for disabling the latter, said manual means being movable from a first to a second position to disable said restraining means and then back to said first position, and secondary restraining means for said driving means operatively connected to said manual means effective to restrain said driving means when said manual means is in said second position and to release said driving means when said manual means is in its first position.

2. The device of claim 1, in which said variable means comprises a potentiometer having a rotatable shaft operatively connected to said driving means, said indicator means comprising a dial carried on said shaft, and in which said control means comprises first means normally effective to maintain said driving means in stopped condition, second means operatively connected to said first means and selectively effective to disable and release said first means.

3. The device of claim 1, comprising manually operated means for setting said variable means to said first value.

4. A condition measuring device providing a readout of the value of the condition being measured, said device comprising sensing means adapted to be exposed to said condition and effective to have an electrical property the value of which varies with said condition, variable means effective to have an electrical property variable between first and second values, driving means operatively connected to said variable means and effective to move said variable means from said first value toward said second value, control means operatively connected to said sensing means and said variable means effective to compare said electrical properties of said sensing means and said variable means and effective to stop said variable means in response to the sensing of a predetermined relationship between said properties, and readout means operatively connected to said variable means and effective to provide a readout of said measured condition in terms of the condition of said variable means when it is stopped, in which said control means comprises a support, a first member mounted thereon and movable between first and second positions in which it respectively engages and is disengaged from said driving means, biasing means active on said first member to bias it towards said first position, a second member mounted on said support, engageable with said first member when the latter is in its second position to latch it in said second position, and actuable to release said first member, and means for thus actuating said second member when said predetermined relationship between said properties is sensed, said device further comprising a shaft operatively connected to, and rotatably driven by, said driving means, a third member operatively connected to and extending radially from said shaft, and a lug extending from said second member into the path of movement of said third member, said third member engaging said lug as said shaft rotates past a given position and moving said second member to a position releasing said first member.

5. The device of claim 4, comprising manually operated means for setting said variable means to said first value, and in which said control means is effective to positively stop said variable means when the latter is at said second value.

6. The device of claim 5, in which said control means is electrical in nature, a source of electricity connected to said control means, said control means being effective after said predetermined property relationship is sensed to disconnect said source of electricity from said control means.

7. A condition measuring device providing a readout of the value of the condition being measured, said device comprising sensing means adapted to be exposed to said condition and effective to have an electrical property the value of which varies with said condition, variable means effective to have an electrical property variable between first and second values, driving means operatively connected to said variable means and effective to move said variable means from said first value towards said second value, control means operatively connected to said sensing means and said variable means effective to compare said electrical properties of said sensing means and said variable means and effective to stop said variable means in response to the sensing of a predetermined relationship between said properties, and readout means operatively connected to said variable means and effective to provide a readout of said measured condition in terms of the condition of said variable means when it is stopped, in which said sensing means and said variable means each comprises variable resistance means operatively connected to form a voltage divider, electric circuit means comprising a voltage source connected across said voltage divider, semiconductor switch means operatively connected to said voltage divider, the level of the voltage output of said voltage divider being effective to place said semiconductor switch means in the conductive state when said predetermined property relationship is sensed, said semiconductor switch means being operatively connected to said control means to energize the latter, and in which said semiconductor switch means comprises a transistor having a control circuit and an output circuit, and a rectifier having a control circuit and an output circuit, said transistor control circuit being connected to said voltage divider, said transistor output circuit being connected to said rectifier control circuit, and said rectifier output circuit being operatively connected to said driving means via an electromagnet, and means operatively connected to said electromagnet and to said rectifier output circuit, responsive to actuation of said electromagnet, and effective to open said rectifier output circuit after said electromagnet has been energized.

8. The device of claim 7, comprising manually operated means for setting said variable means to said first value.

References Cited
UNITED STATES PATENTS

| | | | |
|---|---|---|---|
| 3,139,753 | 7/1964 | Brudner | 73—362(R) |
| 3,184,728 | 5/1965 | Hart et al. | 73—362UX |

LOUIS R. PRINCE, Primary Examiner

F. SHOON, Assistant Examiner